(12) United States Patent
Hatch et al.

(10) Patent No.: US 8,162,788 B2
(45) Date of Patent: Apr. 24, 2012

(54) SYSTEM, DEVICE AND METHOD FOR WIND TURBINE CONTROL BASED ON OPERATING PROFILES

(75) Inventors: Charles T. Hatch, Gardnerville, NV (US); Kenneth P. Ceglia, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 12/548,978

(22) Filed: Aug. 27, 2009

(65) Prior Publication Data

US 2011/0049883 A1     Mar. 3, 2011

(51) Int. Cl.
*F16H 47/08* (2006.01)
(52) U.S. Cl. ............... 475/62; 700/287; 60/239
(58) Field of Classification Search ......... 700/286–287, 700/290; 60/239; 475/62; 515/905
See application file for complete search history.

(56) References Cited

U.S. PATENT DOCUMENTS

| | | | |
|---|---|---|---|
| 6,925,385 B2 * | 8/2005 | Ghosh et al. ............ 702/14 |
| 7,013,203 B2 * | 3/2006 | Moore et al. ............ 700/286 |
| 7,099,800 B2 * | 8/2006 | Henriksen et al. ........... 702/187 |
| 7,318,154 B2 * | 1/2008 | Tehee, Jr. ................ 713/155 |
| 7,523,001 B2 * | 4/2009 | Morjaria et al. ............. 702/3 |
| 7,677,869 B2 * | 3/2010 | Martinez De Lizarduy Romo et al. ............ 416/37 |
| 7,933,744 B2 * | 4/2011 | Jammu et al. ............ 702/185 |
| 7,948,103 B2 * | 5/2011 | Mixter, Jr. .............. 290/44 |
| 7,960,850 B2 * | 6/2011 | Rasmussen .............. 290/44 |
| 2002/0029097 A1 * | 3/2002 | Pionzio et al. ............ 700/286 |
| 2005/0090937 A1 * | 4/2005 | Moore et al. ............ 700/286 |
| 2005/0127680 A1 * | 6/2005 | Lof et al. ............... 290/44 |
| 2007/0140847 A1 * | 6/2007 | Martinez De Lizarduy Romo et al. ............ 416/11 |
| 2007/0246943 A1 * | 10/2007 | Chang et al. ............ 290/44 |
| 2007/0266423 A1 * | 11/2007 | Tehee, Jr. ............... 726/3 |
| 2009/0008939 A1 * | 1/2009 | Pare et al. .............. 290/44 |
| 2009/0259429 A1 * | 10/2009 | Elisiussen .............. 702/113 |
| 2009/0266160 A1 * | 10/2009 | Jeffrey et al. ........... 73/455 |
| 2010/0109328 A1 * | 5/2010 | Li et al. ................ 290/44 |
| 2010/0138188 A1 * | 6/2010 | Mengane et al. .......... 702/182 |
| 2011/0035068 A1 * | 2/2011 | Jensen ................. 700/287 |
| 2011/0137586 A1 * | 6/2011 | Jiang et al. ............. 702/56 |

* cited by examiner

*Primary Examiner* — Ramesh Patel
(74) *Attorney, Agent, or Firm* — Armstrong Teasdale LLP

(57) ABSTRACT

A method for operating a wind turbine based on operating profiles for the wind turbine corresponding to operating modes. The method includes defining operating modes and acquiring a plurality of parameter values, each based on a reading from a sensor of the wind turbine. Each of the parameter values is associated with one of the operating modes to create a wind turbine operating profile for each mode. The wind turbine is controlled based on the operating profiles.

7 Claims, 7 Drawing Sheets

SYSTEM, DEVICE AND METHOD FOR WIND TURBINE CONTROL BASED ON OPERATING PROFILES

BACKGROUND OF THE INVENTION

The field of the invention relates generally to controlling wind turbines and, more particularly, to controlling wind turbines based on wind turbine operating profiles corresponding to operating modes.

A wind farm includes one or more wind turbines that utilize wind energy to generate or produce electrical power. Known wind turbines typically include one or more components (e.g., a controller) attached to a wind farm network. Other devices on the network, such as a server, may receive data from the networked components in a wind turbine for uses in facilitating wind farm management.

For example, a wind turbine may be controlled based on operating parameters such as vibration levels at various levels of power output. Such operating parameters are often provided by sensors of the wind turbine. However, known sensors can produce such a large volume of data that extracting useful information from the sensor data may be difficult. Accordingly, it is desirable to provide wind turbine operating information that can be easily interpreted by a human operator and used to optimize wind turbine performance.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a system is provided for controlling at least one wind turbine. The system includes a controller configured to receive a plurality of parameter values from a sensor monitor and transmit the received parameter values. Each of the parameter values is based on at least one signal transmitted from a sensor that is coupled to a wind turbine. The system also includes a server that includes a communication interface and a processor. The communication interface is coupled to the controller for receiving the parameter values transmitted from the controller. The processor is coupled to the communication interface and is programmed to define a plurality of operating modes for the wind turbine and to associate each of the received parameter values with one of the defined operating modes to create an operating condition of the wind turbine.

In another aspect, a device is provided for use in controlling a wind turbine. The device includes a communication interface, a processor, and a presentation device. The communication interface is coupled to a remote device for receiving a plurality of parameter values that are based on at least one signal transmitted from a sensor that is coupled to the wind turbine. The processor is coupled to the communication interface and is programmed to associate each of the received parameter values with one of a plurality of operating modes of the wind turbine to create an operating profile for each operating mode. The presentation device is coupled to said processor and is configured to present the operating profiles.

In another aspect, a method is provided for controlling a wind turbine. The method includes defining a plurality of operating modes, each of which corresponds to a range of power output for the wind turbine. A plurality of parameter values is acquired by a processor. Each parameter value is based on at least one reading that is transmitted from at least one sensor that is coupled to the wind turbine. Each of the parameter values is associated, by the processor, with one of the operating modes to create a wind turbine operating profile for each mode. An operation of the wind turbine is controlled based on the created wind turbine operating profile.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein facilitate the control of a wind turbine based on operating profiles of the wind turbine in different operating modes. As used herein, the term wind turbine is intended to be representative of any device that generates rotational energy from wind energy and, more specifically, converts kinetic energy of wind into mechanical energy.

An exemplary technical effect of the methods, systems, and apparatus described herein includes at least one of (a) defining a plurality of operating modes; (b) acquiring, by a monitor, a plurality of parameter values, each of the parameter values based on at least one reading from the at least one sensor; (c) associating, by the computer, each of the parameter values with one of the operating modes to create a wind turbine operating profile for each mode; and (d) operating the wind turbine based on the created wind turbine operating profiles.

Figure 1:
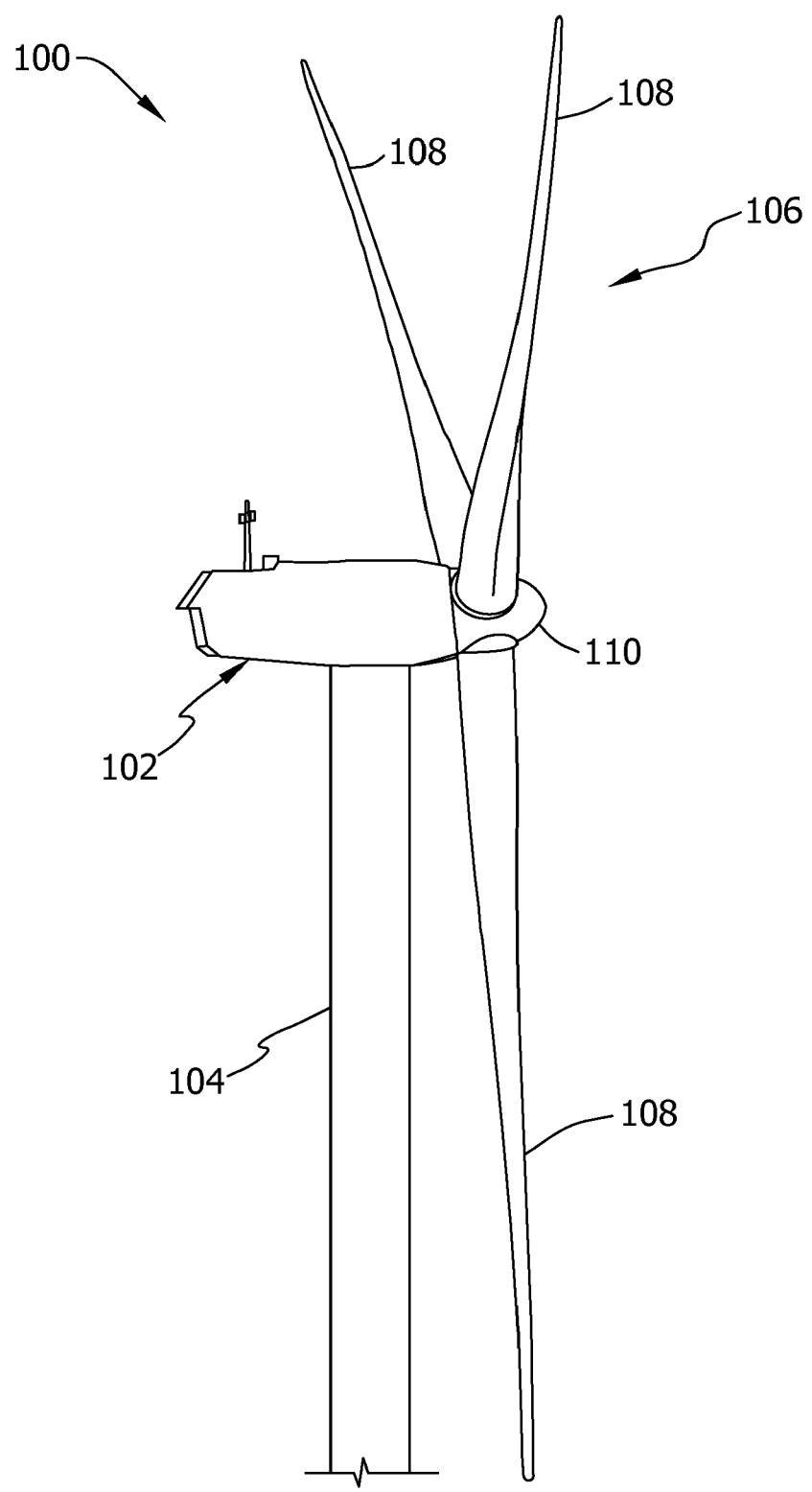
FIG. 1 is a schematic diagram of an exemplary wind turbine.
Figure 2:
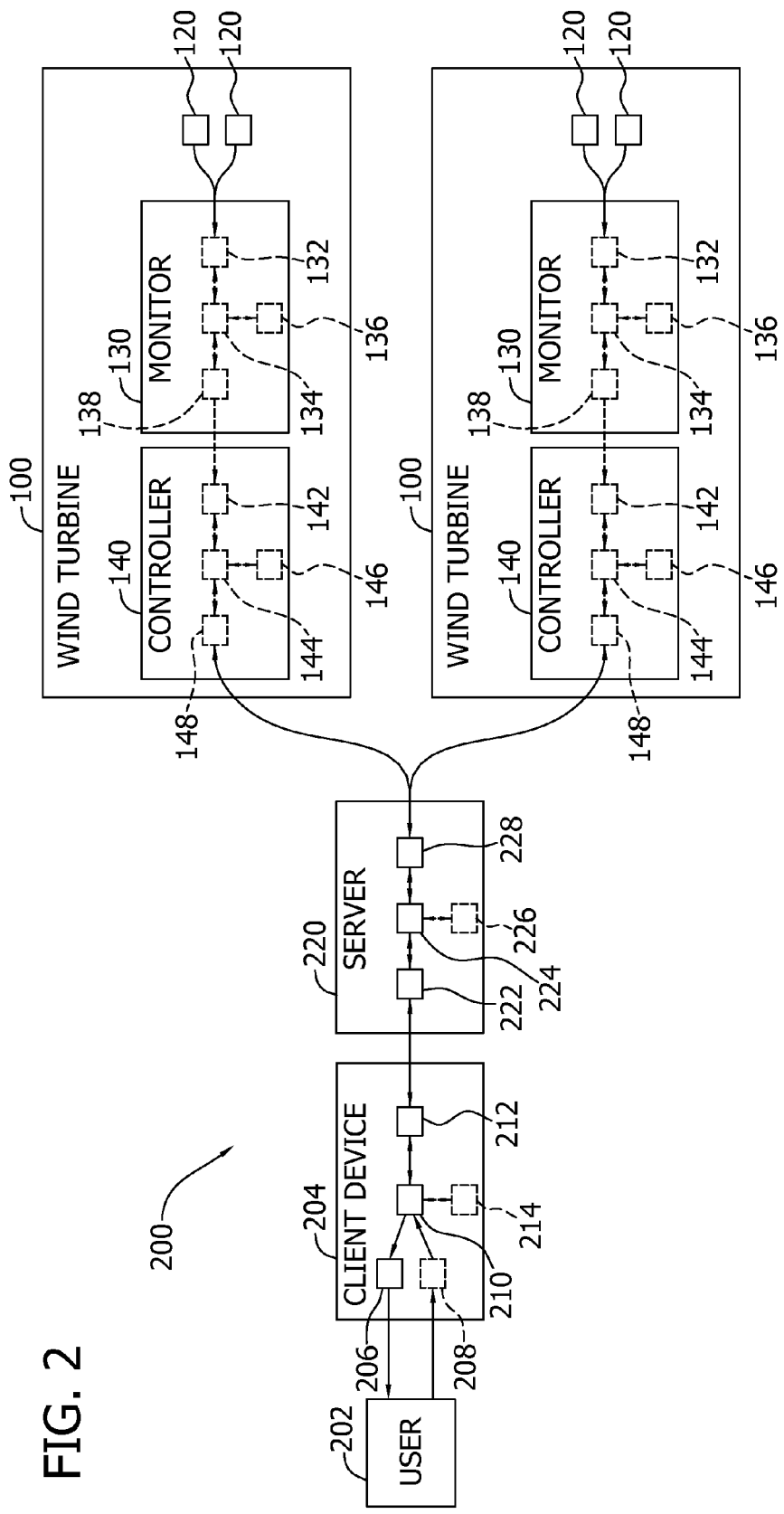
FIG. 2 is a block diagram of an exemplary system for use in controlling a wind turbine such as that shown in FIG. 1.

FIG. 1 is a schematic view of an exemplary wind turbine 100. FIG. 2 is a block diagram illustrating an exemplary system 200 for operating one or more wind turbines 100. Wind turbine 100 includes a nacelle 102 that houses a generator (not shown in FIG. 1). Nacelle 102 is mounted on a tower 104 (only a portion of tower 104 is illustrated in FIG. 1). Tower 104 may be any height that facilitates operation of wind turbine 100 as described herein. In the exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In the exemplary embodiment, wind turbine 100 includes a gearbox (not shown) that is rotatingly coupled to rotor 106 and to a generator.

Wind turbine 100 includes one or more sensors 120 (shown in FIG. 2), that sense or detect wind turbine operating parameters. For example, sensor(s) 120 may include an accelerometer, a vibration sensor (e.g., indicating mechanical vibration of one or more components of wind turbine 100), a power output sensor, a blade pitch sensor, a turbine speed sensor, a gear ratio sensor, an ambient air temperature sensor, a wind speed and/or direction sensor (e.g., an anemometer), an air density sensor, an atmospheric pressure sensor, a humidity sensor, a turbine temperature sensor, a voltage sensor, a current sensor, and/or any sensor suitable for use with wind turbine 100. Each sensor 120 is located according to its function. For example, a wind speed sensor 120 may be positioned on an outside surface of nacelle 102 or tower 104, such that sensor 120 is exposed to air surrounding wind turbine 100. Each sensor 120 generates and transmits a signal corresponding to its function. Moreover, each sensor 120 may transmit a signal continuously, periodically, or only once, for example, though other signal timings are also contemplated. Furthermore, each sensor 120 may transmit a signal either in an analog form or in a digital form.

In the exemplary embodiment, wind turbine 100 also includes a sensor monitor 130 that is coupled to sensors 120. In the exemplary embodiment, sensor monitor 130 includes at least one sensor interface 132 for use in receiving signals transmitted by one or more sensors 120. If wind turbine 100 includes multiple sensors 120, sensor monitor 130 may include multiple sensor interfaces 132 that are coupled to at least one sensor 120. Alternatively, sensor monitor 130 may include only one sensor interface 132 that is coupled to a plurality of sensors 120. Sensor monitor 130 also includes a processor 134 for use in executing computer-executable instructions, a memory 136 for use in storing data and computer-executable instructions, and a communication interface 138 for use in communicating with another device.

Sensors 120 may be coupled to sensor monitor 130 via a low-level serial data connection, such as Recommended Standard (RS) 232 or RS-485, via a high-level serial data connection, such as Universal Serial Bus (USB) or Institute of Electrical and Electronics Engineers (IEEE) 1394 (a/k/a FIREWIRE), via a parallel data connection, such as IEEE 1284 or IEEE 488, via a short-range wireless communication channel such as BLUETOOTH, or via a private (e.g., inaccessible by controller 140 and/or inaccessible outside wind turbine 100) network connection, whether wired or wireless.

In one embodiment, sensor monitor 130 receives one or more signals from a sensor 120 via sensor interface 132 and processes the signal(s) by processor 134 to create a plurality of parameter values. In some embodiments, processor 134 is programmed (e.g., with executable instructions in memory 136) to sample a signal produced by a sensor 120. For example, processor 134 may receive a continuous signal from a sensor 120 and, in response, produce a parameter value based on the continuous signal periodically (e.g., once every five seconds). In some embodiments, processor 134 normalizes a signal received from a sensor 120. For example, a temperature sensor 120 may produce an analog signal with a parameter (e.g., voltage) that is directly proportional to a measured temperature. Processor 134 may be programmed convert the analog signal to a temperature value.

Exemplary parameter values may include, but are not limited to only including, vibration values, such as inboard generator bearing direct vibration amplitude (IGBDVA), temperature, gearbox high speed downwind bearing inner race fault frequency, gear mesh frequency amplitude, and shaft speed. Moreover, processor 134 may be programmed to create an operating parameter value or condition based on signals received from multiple sensors 120. For example, wind turbine 100 may include multiple accelerometers for use in detecting vibration, and processor 134 may calculate a mechanical vibration by averaging, summing, and/or otherwise combining or manipulating the signals from the accelerometers. Sensor monitor 130 also transmits the plurality of parameter values via a communication interface 138 and/or stores one or more signals and/or parameter values in memory 136.

Wind turbine 100 also includes a controller 140. Controller 140 is coupled to sensor monitor 130. In the exemplary embodiment, controller 140 includes a sensor monitor communication interface 142 that is communicatively coupled to communication interface 138 of sensor monitor 130. Controller 140 receives information from sensor monitor 130 associated with signals transmitted by sensors 120. In the exemplary embodiment, controller 140 also includes a processor 144 for use in executing computer-executable instructions, a memory for 146 for use in storing data and computer-executable instructions, and a communication interface 148 for use in communicating with another device.

In the exemplary embodiment, controller 140 receives parameter values from sensor monitor 130 via sensor monitor communication interface 142 and transmits the received parameter values to another device via communication interface 148, for example. In one embodiment, sensor monitor 130 and/or controller 140 are positioned within wind turbine 100. For example, sensor monitor 130 and/or controller 140 may be positioned within nacelle 102 or within tower 104.

In some embodiments, one or more alarms for use with wind turbine 100 are based on a sensor signal and/or a parameter value. For example, an excessive vibration alarm may be triggered if a vibration level in wind turbine 100 exceeds a threshold level, or if a value resulting from a combination of sensor signals or measurement values exceeds a threshold level. Alarms may be configured at sensor monitor 130 and/or controller 140, and each may have a type or severity level, such as "alert" or "danger". Activation of an alarm may produce an alarm notification, such as, but not limited to, an audible alarm, a visual alarm (e.g., a warning light), and/or a transmission (e.g., a network request, a telephone call, or a short message service (SMS) message) to a monitor. Alarm data, such as a type, a parameter or signal threshold, and/or a notification method, may be stored in a memory, such as sensor monitor memory 136 or controller memory 146.

Operable communication between the various elements shown in FIG. 2 is depicted via arrowhead lines that illustrate an exemplary path for signal communication and/or mechanical operation, depending on the element involved. System 200 is accessible by a user 202 via a client device 204. User 202 interacts with client device 204 by perceiving information from a presentation device 206 and, optionally, by manipulating a user input device 208. Client device 204 includes at least one processor 210 for use in executing computer-executable instructions. Processor 210 is coupled to presentation device 206 and, in some embodiments, to user input device 208. Presentation device 206 is any device that is operable by processor 210 and that is capable of conveying (e.g., visually) information to user 202. For example, presentation device 206 may include, but is not limited to only including, a Braille terminal, a printer, a liquid crystal display (LCD), an organic light emitting diode (OLED) display, an "electronic ink" display, a cathode ray tube (CRT), or any other display device.

User input device 208 is any device that is operable by processor 210 and that is capable of receiving input from user 202. User input device 208 may include, for example, a keyboard, a keypad, a pointing device, a mouse, a stylus, a gyroscope, an accelerometer, a position detector, a touch sensitive panel, and/or an audio input device. A single component such as a touch screen may function as both presentation device 206 and user input device 208.

Processor 210 is also coupled to a communication interface 212 and to a server 220. Client device 204 may also include a memory 214 coupled to processor 210. Memory 214 may be used for storing computer executable instructions to be executed by processor 210 and data, such as information related to acquiring, processing, and/or displaying operating information for wind turbine 100.

Client device 204 is any device that is capable of accessing server 220 and interacting with user 202. For example, client device 204 may include, but is not limited to including, a desktop computer, a laptop computer, a netbook, a set-top box, an electronic book reader, a digital music player, a cellular phone, and/or a smart phone. Client device 204 transmits data to and/or receives data from server 220 via communication interface 212.

Server 220 includes a client communication interface 222 for use in communicating with a remote device, such as client device 204. In the exemplary embodiment, client communication interface 222 is coupled to communication interface 212 of client device 204. Server 220 also includes a processor 224 for use in executing computer-executable instructions, and a wind turbine communication interface 228 that is coupled to one or more wind turbines 100. Server 220 may also include a memory 226 for use in storing computer-executable instructions and data, such as wind turbine operating data. Processor 224 is coupled to client communication interface 222, to memory 226 (if present), and to wind turbine communication interface 228.

In operation, server 220 transmits data (e.g., operating profiles for a wind turbine 100) via client communication interface 222. Client device 204 receives the data via communication interface 212. In some embodiments, server 220 initiates communication with client device 204. Alternatively, client device 204 initiates communication by issuing a request to server 220 via communication interface 212, and server 220 responds by transmitting the data.

Processor 224 is coupled to wind turbine communication interface 228. Processor 224 associates each of the received parameter values with one of a plurality of operating modes of wind turbine 100 to create an operating profile of wind turbine 100 for each mode. For example, wind turbine 100 may have six operating modes that each correspond to a range of power output relative to a maximum (100%) power output: 0-25%, 26-40%, 41-55%, 56-70%, 71-85%, 86-100%. In the exemplary embodiment, processor 224 creates the six operating profiles for wind turbine 100.

Operating profiles may take several forms, including, without limitation, structured data, textual descriptions, and graphical representations of parameter values. In some embodiments, processor 224 creates an operating profile of wind turbine 100 for an operating mode by creating a graphical representation of the parameter values associated with the operating mode. For example, processor 224 may create a graphical representation of the parameter values associated with the operating mode by depicting each parameter value as a point on an axis based on a magnitude of the parameter value. Graphical representations for the operating profiles of wind turbine 100 may be combined into a single, combined graphical representation. For example, the graphical representations of the parameter values for each operating mode may be displayed adjacent to each other and using a single scale for magnitude. Such an implementation facilitates comparison of parameter values by operating mode.

In some embodiments, an operating condition is created for a wind turbine. For example, processor 224 may create an operating condition of wind turbine 100 including multiple operating modes, each associated with a plurality of parameter values. In addition to, or in the alternative, processor 224 may include a plurality of operating profiles of wind turbine 100 in the operating condition of wind turbine 100.

In some embodiments, sensor monitor 130 is coupled to multiple sensors 120. In such an embodiment, sensor monitor 130 receives at least one additional transmitted signal from an additional sensor 120 and transmits a plurality of additional parameter values based on the at least one additional received signal. Controller 140 receives the transmitted additional parameter values and, in response, transmits the received additional parameter values. Wind turbine communication interface 228 receives the transmitted additional parameter values from controller 140. Processor 224 creates the operating profiles for use with wind turbine 100 by further associating each of the received additional parameter values with one of the plurality of operating modes of wind turbine 100. In addition to, or in the alternative, processor 224 may create the operating profiles of wind turbine 100 by associating each of the received parameter values with an operating mode based on an additional parameter value associated with the received parameter value. For example, an additional parameter value may indicate a power output (e.g., measured in kilowatts) of wind turbine 100, and the received parameter values may be associated with operating modes corresponding to ranges of power output.

Embodiments described herein are operable with multiple wind turbines 100. In the exemplary embodiment, system 200 includes an additional controller 140 that is coupled to an additional sensor monitor 130 that is, in turn, coupled to an additional sensor 120 of an additional wind turbine 100. Additional sensor monitor 130 receives at least one additional transmitted signal from additional sensor 120 and transmits a plurality of additional parameter values based on the at least one additional received signal. Additional controller 140 receives the transmitted additional parameter values and transmits the received additional parameter values. Wind turbine communication interface 228 receives the transmitted additional parameter values from additional controller 140. Server processor 224 associates each of the received additional parameter values with one of a plurality of operating modes of additional wind turbine 100 to create an operating profile of additional wind turbine 100 for each mode. Client communication interface 222 transmits the created operating profiles of additional wind turbine 100 to the remote device.

In some embodiments, multiple wind turbines 100 are accessible by server 220. In such an embodiment, wind turbine communication interface 228 may receive parameter values from all wind turbines 100 or from only a subset of wind turbines 100. For example, wind turbine communication interface 228 may receive parameter values from a group of wind turbines having a similar or identical location, model number, generation, and/or age. Alternatively, groups of wind turbines may be arbitrarily defined.

Operable communication amongst and/or between the system elements shown in FIG. 2 may be performed through a hardwired or a wireless network. Each device, such as client device 204, server 220, controller 140, and sensor monitor 130, can be a standalone computing device, such as a computer or a network computer, and can include instructions in a variety of computer languages for use on a variety of computer architectures, such as, for example, x86, x86-64, IA64, POWER, SPARC, and/or ARM, and under a variety of operating systems, such as MICROSOFT WINDOWS, MACOS, UNIX, LINUX, and/or any other suitable operating system. Other examples of computing devices include, without limitation, a system having a microprocessor, a microcontroller, and/or any other suitable processing device capable of executing commands of computer readable data and/or a program for executing a control algorithm. In order to perform the methods described herein, as well as the computations therefor, and/or control processes described herein, any of the system elements described herein can include, without limitation, a processor(s), computer(s), memory (e.g., one or more computer readable media), storage, register(s), timing, interrupt(s), communication interfaces, and/or input/output signal interfaces. For example, a computing device may include input signal filtering to enable accurate sampling and conversion and/or acquisitions of signals received from communications interfaces. As described above, the embodiments described herein can be implemented through computer-implemented processes and apparatus for practicing those processes.

Communication between system elements may take various forms of transmissions, requests, and/or responses. For example, a first device may issue a Hypertext Transfer Protocol (HTTP) request to a second device, and the second device may generate and transmit an HTTP response including, for example, Hypertext Markup Language (HTML), Extensible Hypertext Markup Language (XHTML), and/or Extensible Markup Language (XML). The first and second device may communicate using a protocol such as Simple Object Access Protocol (SOAP) or Representational State Transfer (REST). The second device may, in addition or in the alternative, transmit serialized application object data and/or a graphical image representing wind turbine operating data. Other forms of communication are also contemplated.

In an exemplary embodiment, client device 204 is provided for use in controlling a wind turbine. Client device 204 includes a communication interface 212 that is coupled to a remote device such as server 220. Communication interface 212 receives, from the remote device, a plurality of parameter values based on at least one signal from a sensor 120 of wind turbine 100. Client device 204 also includes a processor 210 that is coupled to communication interface 212. Processor 210 associates each of the received parameter values with one of a plurality of operating modes of wind turbine 100 to create an operating profile for each operating mode.

Client device 204 also includes a presentation device 206 that is coupled to processor 210 and that presents the operating profiles. In some embodiments, processor 210 creates an operating profile of wind turbine 100 for an operating mode by creating a graphical representation of the parameter values associated with the operating mode. Presentation device 206 presents the operating profiles by presenting the graphical representation of the parameter values associated with each mode.

In some embodiments, each parameter value includes a measurement value. Processor 210 creates a graphical representation of the parameter values associated with the operating mode by creating a scatter plot for the operating mode. The scatter plot depicts each parameter value as a point on an axis based on the measurement value of the parameter value. Processor 210 may also combine the scatter plots for each operating mode to create a multi-mode scatter plot, and presentation device 206 may present the operating profiles by displaying the multi-mode scatter plot. In addition, or in the alternative, processor 210 may depict at least one parameter threshold for at least one of the operating modes in the scatter plot for the at least one operating mode.

In some embodiments, client device 204 also includes a user input device 208 that is coupled to processor 210. User input device 208, in response to an action by user 202, selects a point of the scatter plot displayed by presentation device 206. For example, a user may position a pointer over a point and either leave the pointer stationary or enter a selection input such as a mouse click. Presentation device 206 then presents detail information for the selected point. The detail information may include the measurement value on which the point is based, an arithmetic mean of measurement values associated with the operating mode, and/or a standard deviation of measurement values associated with the operating mode. A standard deviation may be expressed in absolute terms or as a percentage of the arithmetic mean. Each of the parameter values may include a measurement timestamp, and the detail information presented for the selected point by presentation device 206 may include the measurement timestamp corresponding to the measurement value on which the point is based.

Figure 3:
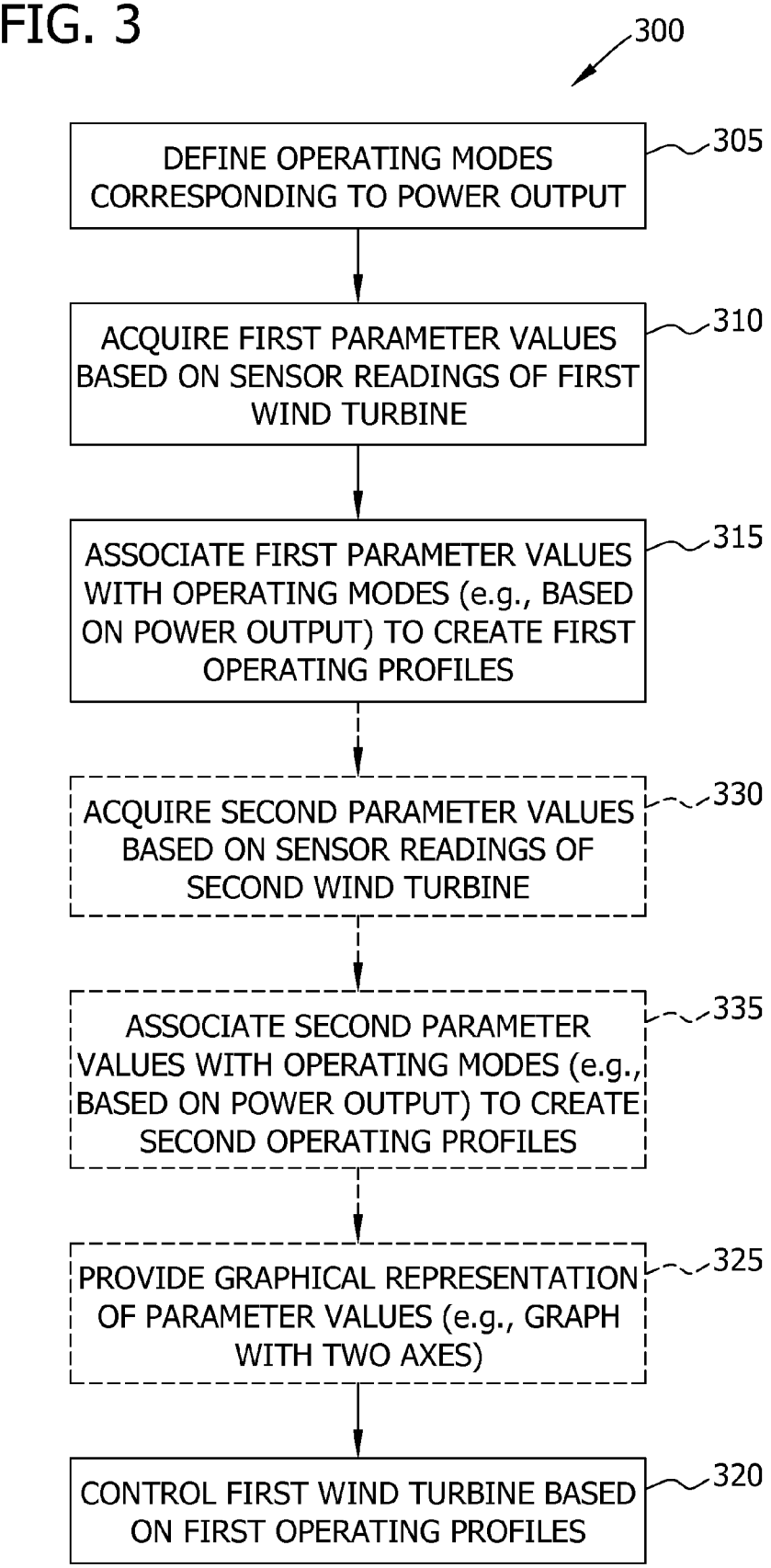
FIG. 3 is a flowchart of an exemplary method for use in controlling a wind turbine based on operating profiles.

FIG. 3 is a flowchart of an exemplary method 300 for use in operating a wind turbine such as wind turbine 100. In the exemplary method 300, a plurality of operating modes are defined 305 that each correspond to a range of power output for the wind turbine. For example, power output may be expressed as a function of kilowatts (kW). A plurality of first parameter values is acquired 310 by a computer. Each of the first parameter values is based on at least one reading from the at least one sensor. Each of the first parameter values is associated 315 with one of the operating modes by the processor to create a wind turbine operating profile for each mode. For example, a power output of the wind turbine, corresponding to the at least one reading on which the first parameter value is based, may be determined, and the first parameter value may be associated with an operating mode corresponding to the determined output. The wind turbine may then be controlled 320 based on the created wind turbine operating profiles. For example, based on the operating profiles, one or more operating modes associated with operational disadvantages may be identified. Operational disadvantages may include, but are not limited to including, mechanically destructive conditions, excessive vibration, and/or excessive heat. The wind turbine may be operated in operating modes other than those identified as being associated with operational disadvantages. Moreover, a user may define alarm thresholds based on the operating profiles.

In some embodiments, a graphical representation of the plurality of parameter values is provided 325 on a presentation device 206. Each of the parameter values is depicted according to the operating mode associated with the parameter value. For example, providing a graphical representation of the plurality of parameter values may include generating a graph having at least a first axis and a second axis that is perpendicular to the first axis, wherein the first axis corresponds to the plurality of operating modes and the second axis corresponds to the plurality of parameter values.

In some embodiments, method 300 is practiced with multiple wind turbines. A plurality of second parameter values that are each based on at least one reading from at least a second sensor of a second wind turbine are acquired 330 by the processor. Each of the second parameter values is associated 335 with one of the operating modes by the processor to create a second wind turbine operating profile for each mode. In one embodiment, a graphical representation of the plurality of first parameter values and the plurality of second parameter values is provided 325 on a display device. Each of the first and second parameter values is depicted according to the operating mode associated with the parameter value.

The methods described herein and associated with the present invention may be encoded as executable instructions embodied in a computer readable medium. Such instructions, when executed by a processor, cause the processor to perform at least a portion of the methods described.

Figure 4:
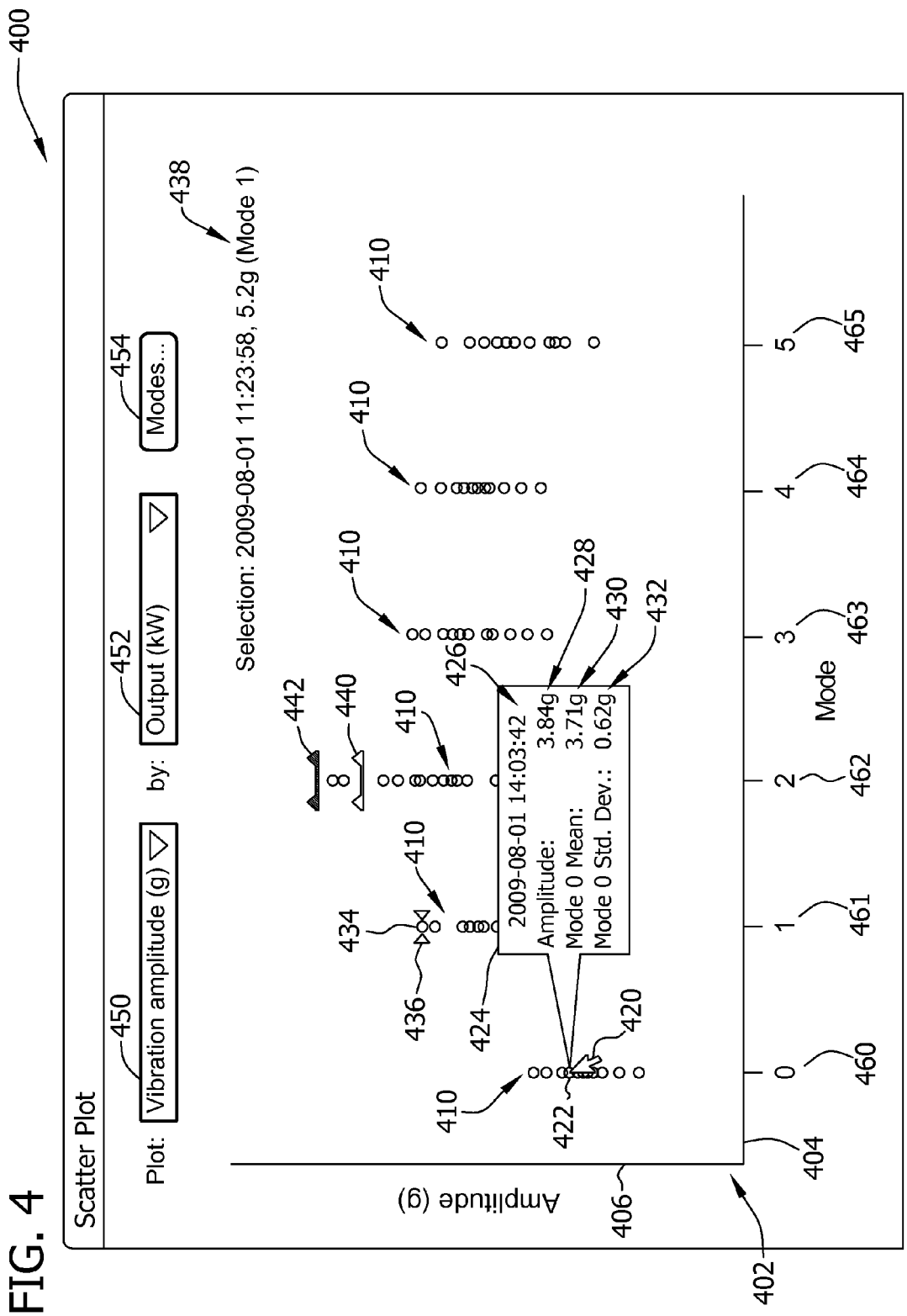
FIG. 4 is an exemplary graphical interface, including a graphical representation of parameter values depicted according to operating mode, that may be used with the system shown in FIG. 2.

FIG. 4 is an exemplary graphical interface 400 including a graphical representation of parameter values depicted according to operating mode and that may be used with the system shown in FIG. 2. Graphical interface 400 includes a graph 402 having a horizontal axis 404 and a vertical axis 406. In the exemplary illustration, horizontal axis 404 corresponds to a plurality of operating modes of a wind turbine, and vertical axis 406 corresponds to vibration amplitude, measured in g's (i.e., acceleration relative to standard gravity, 9.80665 m/s$^2$). Moreover, in the exemplary embodiment, six operating modes 460, 461, 462, 463, 464, and 465 are illustrated that each correspond to a range of power output, measured in kilowatts (kW). Vibration amplitude includes, for example, but is not limited to only including, inboard generator bearing direct vibration amplitude (IGBDVA).

A plurality of data points 410 are plotted in graph 402 in the form of a scatter plot. Each data point 410 represents a parameter value. The data point for a parameter value is positioned along horizontal axis 404 according to the operating mode associated with the parameter value and along vertical axis 406 based on the magnitude of the parameter value or a measurement value of the parameter value. Thus, each operating mode 460, 461, 462, 463, 464, and 465 has a vertical column of data points 410 depicting parameter values associated with that mode. Data points 410 associated with one mode may be graphically distinguished from data points 410 associated with another mode.

A user may interact with graphical interface 400 via a user input device. For example, a user may user a mouse or a touch screen to control a pointer 420 to select one or more data points. As illustrated in FIG. 2, pointer 420 may be "hovered" over (i.e., positioned in a stationary mode) a data point 422. In response, graphical interface 400 displays detail information area 424. Detail information area 424 presents information related to the parameter value represented by data point 422 and/or the operating mode 460 associated with the parameter value. Specifically, detail information area 424 includes a timestamp 426 and a measurement value 428 corresponding to the parameter value. Detail information area 424 also includes statistical information for the measurement values corresponding to operating mode 460. Specifically, detail information area 424 provides an arithmetic mean 430 and a standard deviation 432 of the measurement values. In addition to, or in the alternative, other statistical information, such as, but not limited to, a minimum measurement value, a maximum measurement value, and/or a median, may be displayed in detail information area 424.

The user may also select a data point 434 by, for example, positioning pointer 420 over data point 434 and clicking a mouse button, pressing a touch sensitive panel such as a touch screen, or initiating any other selective action with a user input device. In response, graphical interface 400 displays a selection indicator 436 that is proximate to selected data point 434 and displays detail information text 438. Similar to detail information area 424, detail information text 438 includes information related to the parameter value represented by selected data point 434 and/or the operating mode 461 associated with the parameter value.

Graphical interface 400 may also include threshold indicators such as an alert threshold indicator 440 and a danger threshold indicator 442. Threshold indicators 440 and 442 represent operating parameter thresholds for a wind turbine. For example, the presence of data points above alarm threshold indicator 440 may indicate a potential operational issue. Similarly, the presence of data points above danger threshold indicator 442 may indicate a serious operational issue or malfunction. Operating parameter thresholds may be defined per wind turbine and/or per mode. In some embodiments, operating parameter thresholds may be set by a user, as described in more detail below with regard to FIG. 7.

In the exemplary embodiment, graph 402 may be customized by the user via vertical axis parameter selector 450, operating mode parameter selector 452, and operating mode configuration button 454, for example. Vertical axis parameter selector 450 and operating mode parameter selector 452 include a list of available operating parameters for a wind turbine. For example, if the wind turbine includes a generator temperature sensor, vertical axis parameter selector 450 may include an item such as "Generator temperature (° C.)". In response to the user selecting this item in vertical axis parameter selector 450, graphical interface 400 plots data points 410 along vertical axis 406 according to temperature measurement values expressed in degrees Celsius. Similarly, in response to the user selecting a new value in operating mode parameter selector 452, graphical interface 400 plots data points 410 along horizontal axis 404 according to the newly selected value. In one embodiment, operating modes appropriate for the newly selected horizontal axis parameter are displayed on horizontal axis 404, and data points 410 are displayed according to the newly displayed operating modes. In response to the user engaging operating mode configuration button 454, graphical interface 400 displays an operating mode configuration interface, as described in more detail below with regard to FIG. 6.

In some embodiments, graphical interface 400 updates graph 402 in real time or in near-real time while graph 402 is displayed. Parameter values are continuously or periodically received, and a new data point 410 is displayed in graph 402 for each received parameter value. For example, a client device may "poll" a server for parameter values or for an updated graphical representation of parameter values. Further, recently created data points may be identified in graph 402 and graphically distinguished from non-recent data points. Recently created data points may be defined as data points that have an age below a threshold age (e.g., data points created in the previous 24 hours), as a fixed number of data points per wind turbine or operating mode (e.g., the 200 most recent data points for a specific wind turbine or the fifty most recent data points for an operating mode), or according to some other form of recentness. In addition to, or alternatively, older data points may be removed from graph 402. For example, when the age of a data point exceeds an age threshold, that data point may be removed.

Figure 5:
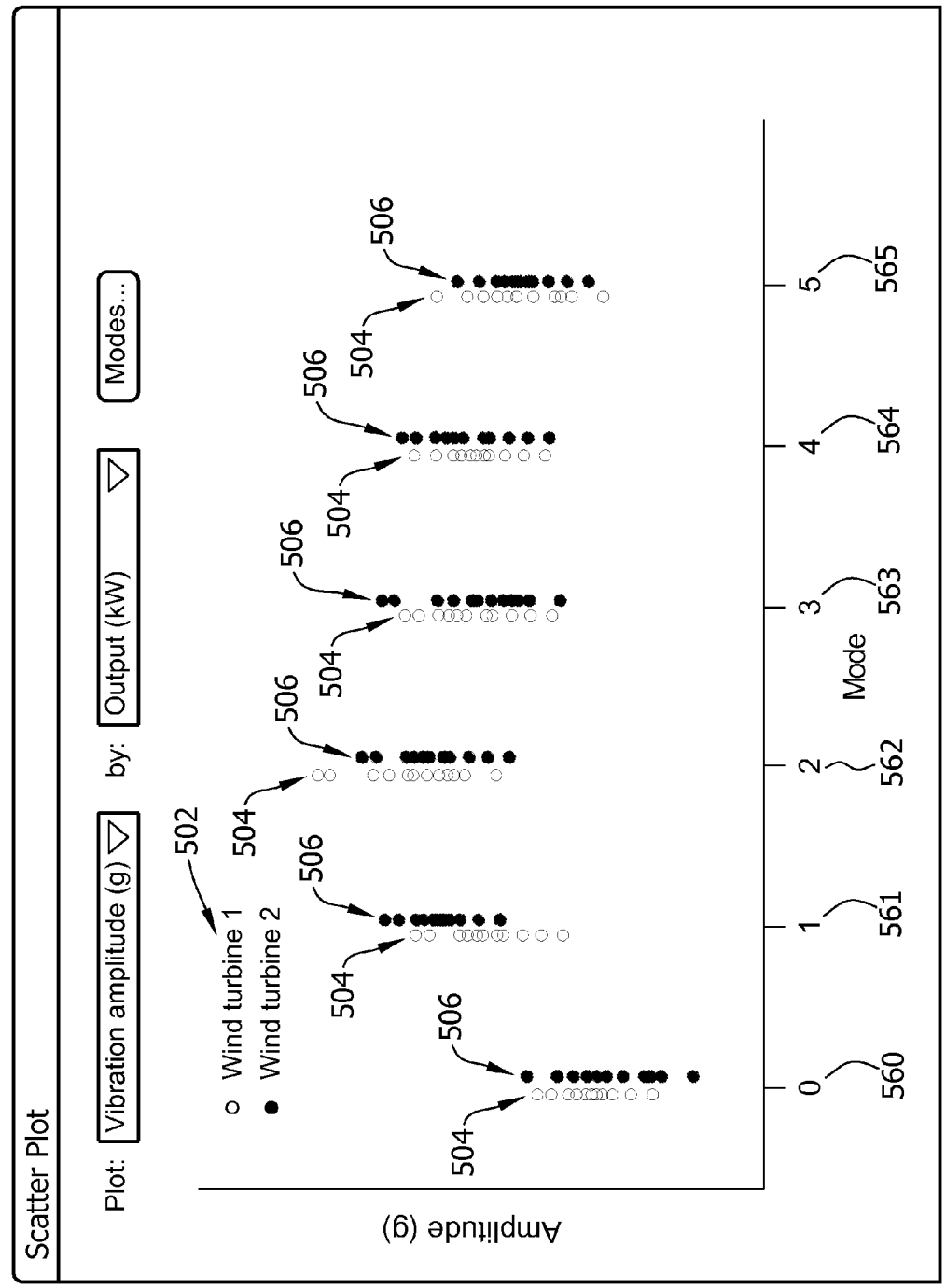
FIG. 5 is an exemplary graphical interface, including a graphical representation of parameter values from two wind turbines, that may be used with the system shown in FIG. 2.

FIG. 5 is an exemplary graphical interface 500 including a graphical representation of parameter values from two wind turbines. Graphical interface 500 is similar to graphical interface 400 of FIG. 4 but displays data points representing parameter values from two wind turbines, Wind Turbine 1 and Wind Turbine 2. Graphical interface 500 includes a legend 502 indicating that data points 504 corresponding to Wind Turbine 1 are displayed as white circles with a black outline, and that data points 506 corresponding to Wind Turbine 2 are displayed as solid black circles. Data points 504 are thereby graphically distinguished from data points 506. Other forms of graphical distinction are also contemplated.

As illustrated in FIG. 5, data points 504 and data points 506 are arranged in adjacent vertical columns for each of six operating modes 560, 561, 562, 563, 564, and 565. However, data points 504 and data points 506 may be displayed in other arrangements and yet be distinguished from each other based on the graphical distinction described above or any other form of graphical distinction. For example, data points 504 and data points 506 may be combined into a single vertical column for each operating mode 560, 561, 562, 563, 564, and 565. In addition to, or alternatively, graphical interface 500 may include a visibility selector for each wind turbine (e.g., in legend 502), and the user may, via a user input device, manipulate the selector for each wind turbine to control whether data points for that wind turbine are displayed in graphical interface 500. Thus, data points corresponding to each wind turbine may be displayed or omitted based on user input.

In some embodiments, multiple columns of data points are displayed for each mode 560, 561, 562, 563, 564, and 565 for a single wind turbine. For example, graphical interface 500 may display a first set of data points representing vibration amplitude measurement values and a second set of data points representing temperature measurement values. Legend 502 may thus indicate which points represent vibration amplitude and which points represent temperature. If the displayed parameter values and/or measurement values are expressed in different units of measurement, the vertical axis may indicate a first scale corresponding to the first set of data points and a second scale corresponding to the second set of data points.

Figure 6:
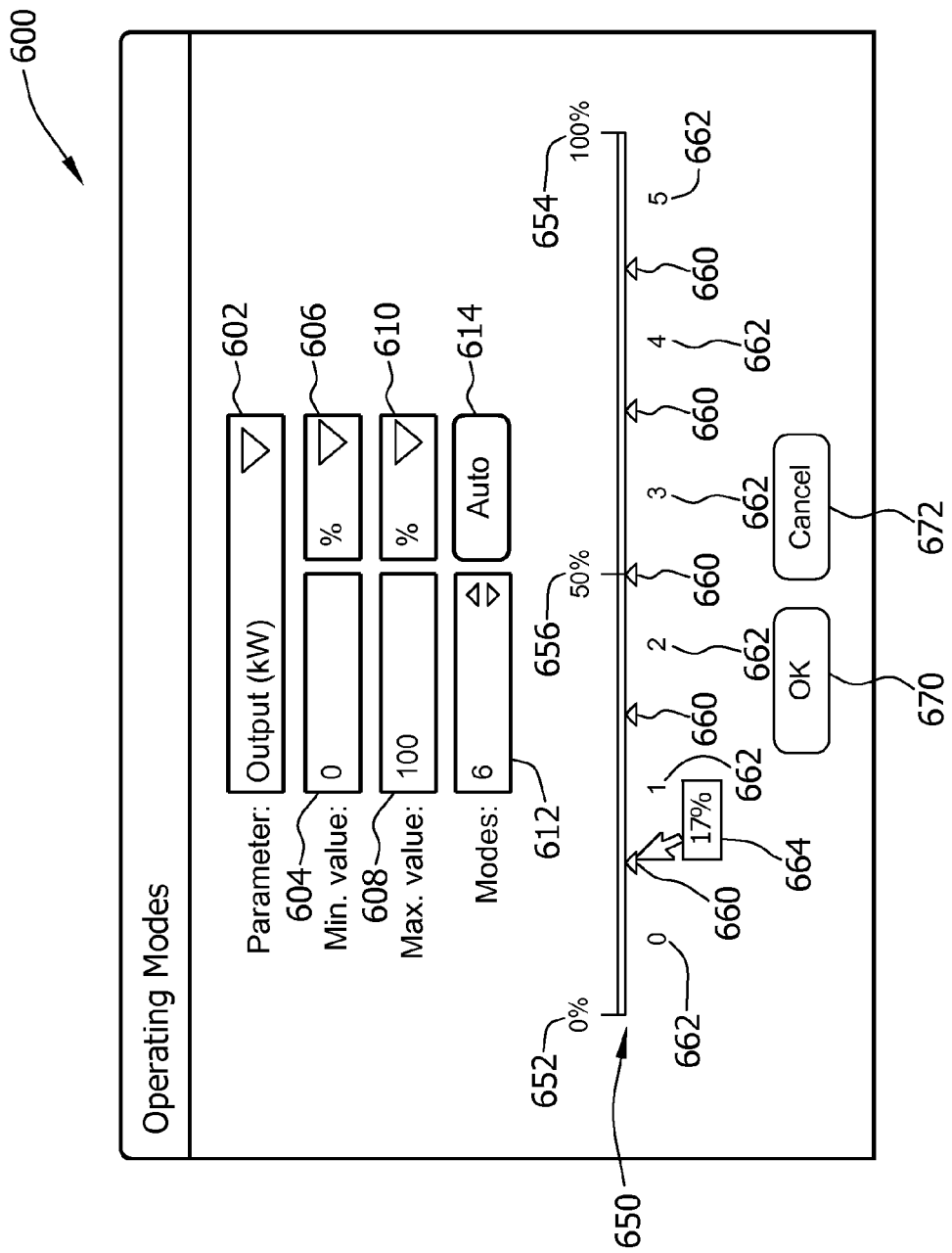
FIG. 6 is an exemplary graphical interface that may be used to configure operating modes and that may be used with the system shown in FIG. 2.

FIG. 6 is an exemplary graphical interface 600 for use in configuring operating modes and that may be used with system 200 shown in FIG. 2. Specifically, graphical interface 600 enables a user to define operating mode boundaries using an operating mode boundary selector 650, as described in more detail below.

In the exemplary embodiment, graphical interface 600 includes a parameter selector 602 that enables the user to select an operating parameter for which to define operating modes. An operating mode configuration may be defined and stored for each of a plurality of operating parameters, such that the user may later select a given operating parameter for graphing (e.g., using operating mode parameter selector 452 illustrated in FIG. 4) and subsequently view a graph based on an operating mode configuration previously defined for that operating parameter.

Graphical interface 600 also includes a minimum value input field 604, a minimum value dimension selector 606, a maximum value input field 608, and a maximum value dimension selector 610. Dimension selectors 606 and 610 enable the user to select a dimension to associate with the values specified in input fields 604 and 608, respectively. Graphical interface 600 may automatically populate each dimension selector 606 and 610 with a value appropriate for the parameter selected in parameter selector 602. For example, if power output is selected in parameter selector 602, and power output is measured as a percentage of maximum power output for a wind turbine, dimension selectors 606 and 610 may be populated with the value "%", as illustrated in FIG. 6. The value specified in minimum value input field 604 determines a lower bound 652 of operating mode boundary selector 650, and the value specified in maximum value input field 608 determines an upper bound 654 of operating mode boundary selector 650. A midpoint 656 and any number of other intermediate points (not shown) may also be displayed on operating mode boundary selector 650.

Operating mode boundary selector 650 defines a range of values for each operating mode. In the exemplary embodiment, operating modes are arranged with contiguous value ranges and, therefore, do not overlap. In the exemplary embodiment, ranges are defined by positioning sliders 660 within operating mode boundary selector 650 between lower bound 652 and upper bound 654.

Graphical interface 600 includes a mode quantity selector 612 and an automatic boundary configuration button 614. The value in mode quantity selector 612 determines the number of operating modes to define and, as a result, also determines the number of sliders 660 and mode identifiers 662 provided on operating mode boundary selector 650. In the example of FIG. 6, six operating modes are specified in mode quantity selector 612, and six mode identifiers 662 are displayed, with a slider 660 positioned between each pair of adjacent mode identifiers, for a total of five sliders 660. In the exemplary embodiment, automatic boundary configuration is provided by an automatic boundary configuration button 614. In response to a user engaging this button, graphical interface 600 automatically positions sliders 660 within operating mode boundary selector 650. In one embodiment, graphical interface 600 spaces sliders 660 substantially equidistantly between lower bound 652 and upper bound 654. For example, automatic boundary configuration of four modes between a lower bound of 0% and an upper bound of 100% may result in the following ranges: 0-25%, 26-50%, 51-75%, and 76-100%. As a slider 660 is adjusted, a value corresponding to the current position of the slider may be displayed in a current value indicator 664.

The user may elect to accept the operating mode configuration specified in graphical interface 600 by selecting or engaging an "OK" button 670. Alternatively, the user may discard the configuration in graphical interface 600 and return to the previous state by selecting or engaging a "Cancel" button 672.

Figure 7:
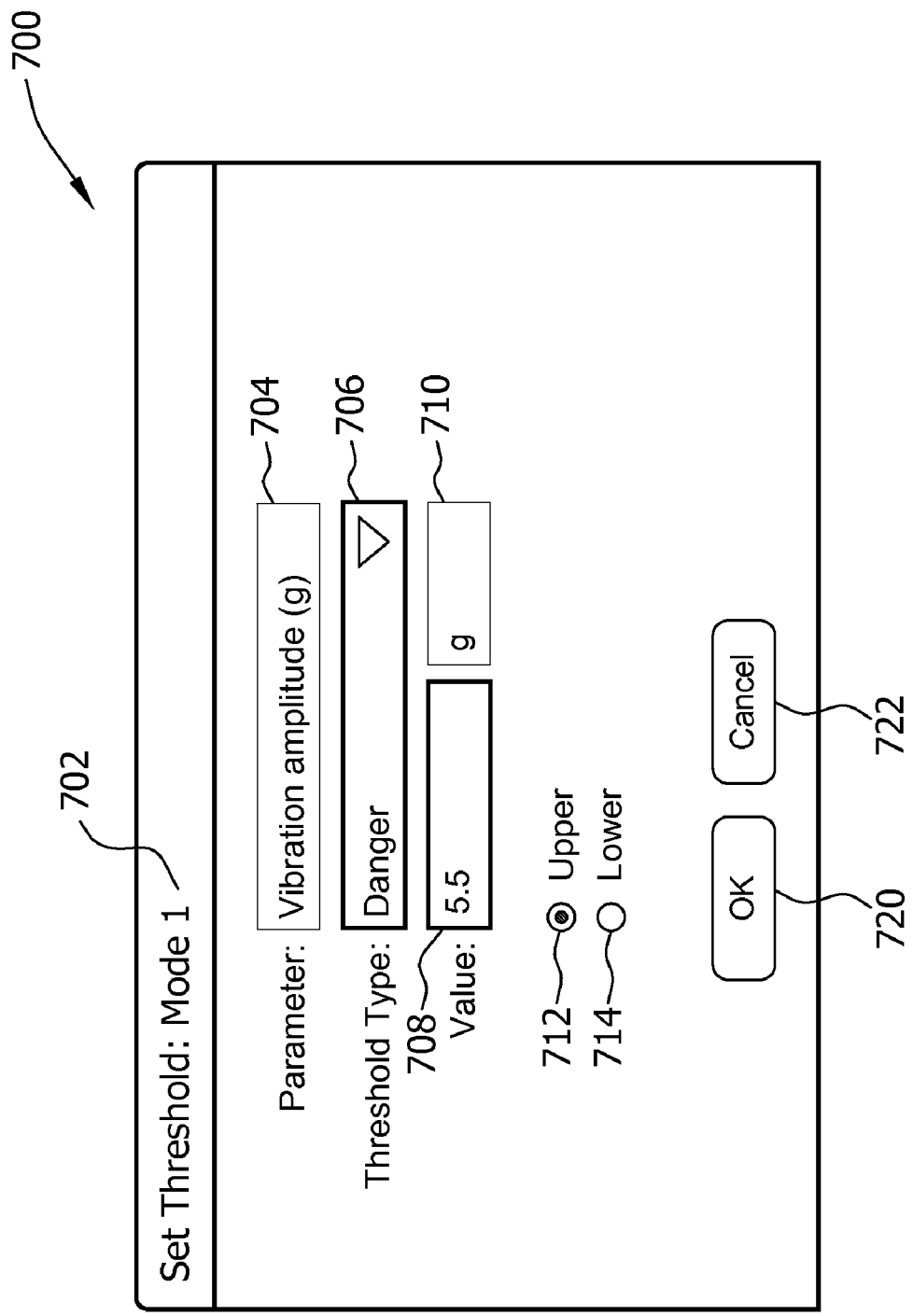
FIG. 7 is an exemplary graphical interface that may be used to define an operating parameter threshold and that may be used with the system shown in FIG. 2.

FIG. 7 is an exemplary graphical interface 700 for use in defining an operating parameter threshold. In the exemplary embodiment, graphical interface 700 includes a title 702 and a parameter indicator 704 that each indicate, respectively, the operating mode and the operating parameter for which a threshold is being defined. A threshold type may be specified using a threshold type selector 706. Available threshold types may include, for example, but are not limited to only including, "danger" and "alert", and may indicate a severity of a condition in which data points appear above or below the threshold. Operating parameter thresholds of different types may be graphically distinguished from each other when displayed (e.g., in graph 402 illustrated in FIG. 4).

Graphical interface 700 also includes a value input field 708 and a dimension indicator 710. Dimension indicator 710 illustrates the unit of measurement in which to express the value entered in value input field 708. For example, a vibration level may be specified in g's, and a temperature may be specified in degrees Celsius. Graphical interface 700 populates dimension indicator 710 with a value appropriate for the operating parameter displayed in parameter indicator 704.

In the exemplary embodiment, graphical interface 700 also includes upper bound radio button 712 and lower bound radio button 714 for specifying whether a threshold should be an upper bound or a lower bound. Selection of radio buttons 712 and 714 is mutually exclusive. If upper bound radio button 712 is selected, a value less than the value entered in value input field 708 is considered to be within the threshold. If lower bound radio button 714 is selected, a value greater than the value entered in value input field 708 is considered to be within the threshold.

The user may elect to accept the threshold definition in graphical interface 700 by selecting or engaging an "OK" button 720. Alternatively, the user may discard the threshold definition in graphical interface 700 and return to the previous state by selecting or engaging a "Cancel" button 722.

In one embodiment, graphical interface 700 suggests a threshold by populating value input field 708 with a value based on statistical information for a selected operating mode. For example, graphical interface 700 may calculate a suggested value equal to an arithmetic mean for the operating mode plus or minus a predetermined number of standard deviations for the operating mode (e.g., mean plus three standard deviations).

In some embodiments, after the threshold definition in graphical interface 700 has been accepted, or upon a separate operation (e.g., selecting or engaging an "upload alarms" button, not shown), one or more operating parameter threshold configurations are transmitted to one or more wind turbines. For example, a wind turbine operating threshold may be transmitted to a sensor monitor, via a server and a controller, and saved by the sensor monitor in its memory as an alarm. In addition, or in the alternative, a user may transmit the operating parameter threshold configurations for all displayed thresholds to the sensor monitor.

Described herein are exemplary embodiments of methods and systems that facilitate operation of one or more wind turbines based on operating profiles corresponding to operating modes. Grouping operational data points according to operating mode simplifies the presentation of information to a user, facilitating improved interpretation of the data. Specifically, such presentation facilitates interpretation of how data points cluster by operating mode, how data points vary within an operating mode, how data points compare to existing alarm thresholds, and whether significant outliers exist. Moreover, providing statistical information based on operating modes allows a user to control operation of a wind turbine and/or set appropriate operating thresholds according to operating mode.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

Some embodiments described involve graphical presentation of operating data. In particular, some embodiments facilitate graphically emphasizing or distinguishing one or more presented elements. Graphical emphasis and distinction may include the use of color (i.e., hue, value, and/or saturation), shading (e.g., darkening elements other than emphasized elements), a fill pattern (e.g., hatching), line weight, scale (e.g., enlarging an element relative to another), and/or animation (e.g., blinking), though other forms of graphical emphasis and distinction are also contemplated.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The above examples are exemplary only, and thus are not intended to limit in any way the definition and/or meaning of the term processor.

While the invention has been described in terms of various specific embodiments, those skilled in the art will recognize that the invention may be practiced with modification within the spirit and scope of the claims.

What is claimed is:

1. A device for use in controlling a wind turbine, said device comprising:
    a communication interface coupled to a remote device for receiving a plurality of parameter values based on at least one signal transmitted from a sensor coupled to the wind turbine, wherein said plurality of parameter values includes a first set of parameter values and a second set of parameter values that is different from the first set of parameter values, said first set of parameter values indicative of a wind turbine vibration;
    a processor coupled to said communication interface and programmed to associate each of the received parameter values with one of a plurality of operating modes of the wind turbine to create an operating profile for each operating mode; and
    a presentation device coupled to said processor and configured to present the operating profiles.

2. A device according to claim 1, wherein said processor is programmed to create an operating profile for an operating mode by creating a graphical representation of the parameter values associated with the operating mode, wherein said presentation device comprises a display device configured to present the operating profiles by displaying the graphical representation of the parameter values associated with each mode.

3. A device according to claim 2, wherein each of the parameter values comprises a measurement value, wherein said processor is programmed to create a graphical representation of the parameter values associated with the operating mode by creating a scatter plot for the operating mode, the scatter plot depicting each parameter value as a point on an axis based on the measurement value of the parameter value.

4. A device according to claim 3, wherein said processor is further programmed to combine the scatter plot for each operating mode to create a multi-mode scatter plot, wherein the display device is configured to display the operating profiles by displaying the multi-mode scatter plot.

5. A device according to claim 3, wherein said processor is further programmed to depict at least one parameter threshold for at least one of the operating modes in the scatter plot for the at least one operating mode.

6. A device according to claim 3, further comprising a user input device coupled to said processor, said user input device configured to, in response to an action by a user, select a point of the scatter plot displayed by said display device, wherein said display device is further configured to display detail information for the selected point, the detail information comprising one or more of the following: the measurement value on which the point is based, an arithmetic mean of measurement values associated with the operating mode, and a standard deviation of measurement values associated with the operating mode.

7. A device according to claim 6, wherein each of the parameter values further comprises a measurement timestamp, wherein display device is configured to display detail information for the selected point by further displaying the measurement timestamp corresponding to the measurement value on which the point is based.

\* \* \* \* \*